US012784063B2

(12) United States Patent
Collen et al.

(10) Patent No.: US 12,784,063 B2
(45) Date of Patent: Nov. 3, 2026

(54) MARKETPLACE FOR PHYSICAL ASSETS LINKED WITH DIGITAL ASSETS

(71) Applicant: ENDSTATE AUTHENTIC LLC, West Roxbury, MA (US)

(72) Inventors: Bennett Collen, West Roxbury, MA (US); Stephen Huh, New York, NY (US); Matthew Michaud, Ashburnham, MA (US); Wayne Nilsen, Amherst, NH (US); Davis Wamola, Mountain View, CA (US); Alan Zhou, Webbwood (CA)

(73) Assignee: ENDSTATE AUTHENTIC LLC, West Roxbury, MA (US)

( * ) Notice: Subject to any disclaimer, the term of this patent is extended or adjusted under 35 U.S.C. 154(b) by 53 days.

(21) Appl. No.: 18/532,804

(22) Filed: Dec. 7, 2023

(65) Prior Publication Data

US 2024/0193656 A1 Jun. 13, 2024

Related U.S. Application Data

(60) Provisional application No. 63/430,975, filed on Dec. 7, 2022.

(51) Int. Cl.
*G06Q 30/00* (2023.01)
*G06Q 20/36* (2012.01)
(Continued)

(52) U.S. Cl.
CPC ......... *G06Q 30/0185* (2013.01); *G06Q 20/36* (2013.01); *G06Q 30/0613* (2013.01);
(Continued)

(58) Field of Classification Search
CPC .................................................. G06Q 30/0185
See application file for complete search history.

(56) References Cited

U.S. PATENT DOCUMENTS 10,853,592 B2 12/2020 Rodriguez et al.
10,977,456 B1 4/2021 Davis
(Continued)

FOREIGN PATENT DOCUMENTS

CN 111651731 A 9/2020

OTHER PUBLICATIONS

Ferro, Enrico, et al. "Digital assets rights management through smart legal contracts and smart contracts." Blockchain: Research and Applications 4.3 (2023): 100142.*
(Continued)

*Primary Examiner* — Kathleen Palavecino
(74) *Attorney, Agent, or Firm* — Kevin M. Kercher

(57) ABSTRACT

A computer-implemented method for transferring rights to a physical object with a digital asset. The method includes obtaining a wallet identifier associated with a seller of the physical object. The method includes receiving, from a computing device, an identifier associated with the physical object. The identifier is obtained by the computing device scanning the physical object. The method includes determining a wallet associated with the wallet identifier that owns the digital asset linked to the physical object. The method includes determining the physical object is authentic. The method includes transferring one or more rights to the physical object and the digital asset to a buyer.

30 Claims, 14 Drawing Sheets

(51) Int. Cl.

| | |
|---|---|
| ***G06Q 30/018*** | (2023.01) |
| ***G06Q 30/0601*** | (2023.01) |
| ***H04L 9/00*** | (2022.01) |
| *G06K 7/10* | (2006.01) |
| *G06K 19/07* | (2006.01) |

(52) U.S. Cl.

CPC ............ *H04L 9/50* (2022.05); *G06K 7/10297* (2013.01); *G06K 19/0723* (2013.01); *G06Q 2220/00* (2013.01)

(56) References Cited

U.S. PATENT DOCUMENTS

| | | | | |
|---|---|---|---|---|
| 11,113,754 | B2 | 9/2021 | Andon et al. | |
| 11,348,152 | B1 | 5/2022 | Davis | |
| 11,475,494 | B1 | 10/2022 | Davis | |
| 11,790,418 | B1 | 10/2023 | Jay et al. | |
| 12,277,562 | B1 | 4/2025 | Medure et al. | |
| 2010/0181377 | A1 | 7/2010 | Chen et al. | |
| 2017/0270324 | A1 | 9/2017 | Younger et al. | |
| 2018/0062835 | A1 | 3/2018 | Hamel et al. | |
| 2019/0102756 | A1 | 4/2019 | Zhou et al. | |
| 2019/0303921 | A1 | 10/2019 | Mutter | |
| 2019/0305943 | A1 | 10/2019 | Hoersten et al. | |
| 2021/0103938 | A1 | 4/2021 | Bulawski et al. | |
| 2021/0248653 | A1 | 8/2021 | Mckenzie et al. | |
| 2022/0207119 | A1 | 6/2022 | Andon et al. | |
| 2022/0294630 | A1 | 9/2022 | Collen | |
| 2022/0309491 | A1 | 9/2022 | Shapiro et al. | |
| 2023/0010172 | A1 | 1/2023 | Myers et al. | |
| 2023/0034169 | A1 | 2/2023 | Ferenczi | |
| 2023/0070389 | A1* | 3/2023 | Madhusudhan ..... | G06Q 10/083 |
| 2023/0119584 | A1 | 4/2023 | Quigley et al. | |
| 2023/0131380 | A1 | 4/2023 | Sandu | |
| 2023/0196341 | A1 | 6/2023 | Quigley et al. | |
| 2023/0246836 | A1 | 8/2023 | Wentker et al. | |
| 2023/0334472 | A1* | 10/2023 | Pene ...................... | G06Q 20/10 |
| 2024/0005354 | A1 | 1/2024 | Rush et al. | |
| 2024/0096070 | A1* | 3/2024 | Figge ................. | G06V 10/7747 |
| 2024/0330891 | A1* | 10/2024 | Pistone .............. | G06Q 20/1235 |
| 2024/0354757 | A1 | 10/2024 | Pirseyedi | |
| 2025/0055713 | A1 | 2/2025 | Theeg et al. | |

OTHER PUBLICATIONS

International Search Report and Written Opinion mailed Apr. 3, 2024 in corresponding International Application No. PCT/US2023/082993 (12 pages).

International Search Report and Written Opinion mailed Apr. 9, 2024 in corresponding International Application No. PCT/US23/82996 (10 pages).

* cited by examiner

MARKETPLACE FOR PHYSICAL ASSETS LINKED WITH DIGITAL ASSETS

CROSS REFERENCE TO RELATED APPLICATIONS

This application claims priority to U.S. provisional application Ser. No. 63/430,975, filed on Dec. 7, 2022. The entire contents of the above identified application is incorporated herein by reference as if fully set forth herein.

TECHNICAL FIELD

Disclosed are embodiments related to digital assets, physical assets, and methods and apparatuses for transferring rights for digital assets linked with physical assets. More particularly, this disclosure relates to computer-implemented methods and apparatuses for transferring rights to a physical object with a near-field communication (NFC) chip and linked with a digital asset, such as, for example, a non-fungible token (NFT).

BACKGROUND

A new breed of entrepreneur has emerged. Creators of all persuasions—entertainers, athletes, artists, gamers—have massive audiences who crave authentic interaction and engagement with the creators they adore. Historically, these creators have had limited options for engaging and monetizing their fanbases, and their fans have had limited options to support and signal their affiliation with the creators.

Digital assets, such as cryptographic ("Crypto") tokens, like non-fungible tokens ("NFTs"), have emerged to help fill the gap. Crypto assets help align incentives amongst creators and their fans as creators can sell NFTs directly to fans. Another way to interact with fans is to sell physical objects linked with NFTs. For example, a sportswear brand may release a sneaker line associated with an athlete where each pair of sneakers may be linked to a corresponding NFT. When a user buys a new pair of sneakers, they may also claim ownership of the corresponding NFT.

SUMMARY

Each physical object (e.g., sneaker) includes a near-field communication ("NFC") chip embedded within or attached to the object. The buyer can verify the authenticity of the physical object by scanning the NFC chip with their device, such as a smart phone. When, for example, the antenna of the smart phone connects with the NFC chip, the phone displays a webpage showing the linked NFT and the wallet owning the NFT. The NFC chip provides an additional layer of authenticity, verification, and security as only scanning the authentic object will display the correct NFT. Through this process, an owner can be assured they own an authentic version of the physical object.

NFTs represent an exciting evolution in asset ownership in digital environments, but equally exciting is their potential to bridge the digital and the physical. Purchasing physical objects linked with NFTs, however, is potentially risky for buyers. Current approaches involve establishing a marketplace for either NFTs or physical objects. A buyer who purchases a physical object linked with an NFT has to trust 1) that the seller owns an authentic version of the physical object, 2) owns the NFT linked with the physical object, and 3) will sell the buyer both the physical object and the NFT in separate transactions. At each step in the purchasing process, there is the potential for the buyer to be scammed and receive a fraudulent product. As such, a novel technique is required to effectively manage physical objects linked with NFTs.

Some embodiments disclosed herein allow users to sell and purchase physical objects linked with digital assets, such as NFTs. In some embodiments, a seller may be required to prove ownership of both the physical object and the linked NFT before the object can be listed on the marketplace. In an exemplary embodiment, a user may list for sale a pair of sneakers and an NFT linked with the sneakers. The user may be required to link their digital wallet to the marketplace to prove they own the NFT. The user may also be required to scan an NFC chip in the sneakers to prove the sneakers are authentic. In some embodiments, when a buyer purchases a physical object, the authenticity of the object is verified by the marketplace prior to releasing the funds of the sale and transferring ownership of the NFT.

An advantage of embodiments disclosed herein is that they provide an efficient method of transferring rights to, such as ownership in, physical objects linked with a digital asset, such as an NFT. A purchaser can be assured they will receive both the authentic an physical object and the corresponding NFT. Such assurances of authenticity are necessary to establish a marketplace for these entangled goods.

According to a first aspect, a computer-implemented method for transferring rights of a physical object with a digital asset. The method includes obtaining a wallet identifier associated with a seller of the physical object. The method includes receiving, from a computing device, an identifier associated with the physical object. The identifier is obtained by the computing device scanning the physical object. The method includes determining a wallet associated with the wallet identifier that owns the digital asset linked to the physical object. The method includes determining the physical object is authentic. The method includes transferring one or more rights to the physical object and the digital asset to a buyer.

In some embodiments, the rights transferred to the buyer include one or more of: ownership rights, fractional ownership rights, temporary ownership rights, leasing, and renting.

In some embodiments, the physical object includes a near-field communication (NFC) chip and the identifier is obtained by the computing device scanning the NFC chip of the physical object.

In some embodiments, determining the physical object is authentic comprises: receiving an authentication message indicating the physical object includes the NFC chip, wherein the authentication message was transmitted by the buyer or a third party.

In some embodiments, the method includes receiving a signature of the wallet, wherein the signature indicates that the seller owns the wallet.

In some embodiments, the method includes generating a listing for the physical object as a result of determining the wallet owns the digital asset.

In some embodiments, the method includes moving the digital asset into an escrow wallet account or receiving an indication of a right to transfer smart contract related to the NFT.

In some embodiments, the method includes receiving a purchasing message transmitted from the buyer, wherein the purchasing message indicates the listing; and receiving a funds message, wherein the funds message indicates monetary funds were received by an escrow account or a transfer of funds smart contract was signed by the buyer.

In some embodiments, the method includes determining a quality of the physical object; and determining whether the quality of the physical object satisfies a quality threshold or the quality matches a description of the physical object.

In some embodiments, the method includes determining the quality of the physical object comprises analyzing one or more images of the physical object using a machine learning model.

In some embodiments, the method includes receiving a validation message, wherein the validation message indicates the seller has possession of the physical object.

In some embodiments, the rights are transferred as a result of receiving the validation message.

In some embodiments, the digital asset includes a cryptographic token.

In some embodiments, the cryptographic token is a non-fungible token (NFT).

In some embodiments, the physical object is one or more of: footwear, apparel, art, equipment, an event ticket, and a functional asset.

According to a second aspect, a computing device is provided. The computing device includes processing circuitry and a memory containing instructions executable by the processing circuitry for transferring rights of a physical object with a digital asset. The computing device operative to obtain a wallet identifier associated with a seller of the physical object. The computing device operative to receive, from a computing device, an identifier associated with the physical object. The identifier is obtained by the computing device scanning the physical object. The computing device operative to determine a wallet associated with the wallet identifier that owns the digital asset linked to the physical object. The computing device operative to determine the physical object is authentic. The computing device operative to transfer one or more rights to the physical object and the digital asset to a buyer.

According to a third aspect, a computer program product is provided comprising a non-transitory computer readable medium storing a computer program comprising instructions which, when executed by processing circuitry, causes the processing circuitry to carry out the method of the embodiments of the first aspect.

According to a fourth aspect, an apparatus for transferring rights of a physical object with a digital asset. The apparatus includes a memory and processing circuitry coupled to the memory, wherein the apparatus is configured to: obtain a wallet identifier associated with a seller of the physical object; receive, from a computing device, an identifier associated with the physical object, wherein the identifier is obtained by the computing device scanning the physical object; determine a wallet associated with the wallet identifier that owns the digital asset linked to the physical object; determine the physical object is authentic; and transfer one or more rights to the physical object and the digital asset to a buyer.

BRIEF DESCRIPTION OF THE DRAWINGS

The accompanying drawings, which are incorporated herein and form part of the specification, illustrate various embodiments.

DETAILED DESCRIPTION

Figure 1:
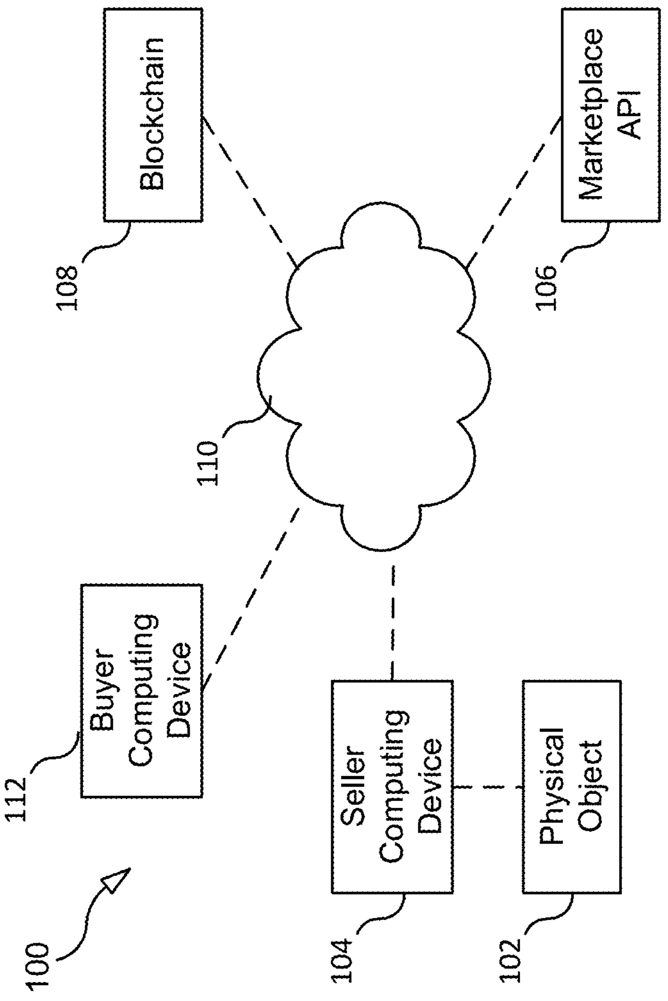
FIG. 1 is a block diagram illustrating an architecture for transferring rights to a physical object linked with a NFT according to some embodiments.

FIG. 1 is a block diagram illustrating an architecture for transferring rights to a physical object linked with a NFT according to some embodiments. The owner of a physical object 102 (e.g., footwear, such as a pair of sneakers, apparel, equipment, an event ticket, or a functional asset) may list physical object 102 for sale on a marketplace. Physical object 102 may be linked to a digital asset, such as a cryptographic token, like an NFT, whose record of ownership is stored on a blockchain 108. In some embodiments, the listing may be part of a primary sale (e.g., selling a new item) or a secondary sale (e.g., selling a used item). Due to the "entangled" nature of physical object 102 (also sometimes called "phygital" or "digi-physi" or "digi-physical" goods), the marketplace may require the seller to verify ownership of physical object 102 and the corresponding NFT before listing physical object 102 for sale.

The seller may connect seller computing device 104 with a marketplace application programming interface ("API") 106 utilizing a network 110 (e.g., the internet). Using seller computing device 104, the seller may connect their crypto wallet with marketplace API 106. In some embodiments, a crypto wallet may be embodied as any container/storage medium for digital assets. The marketplace may verify ownership of the NFT by comparing the address of the wallet with the listed owner in blockchain 108. The seller may verify ownership of physical object 102 by scanning it with seller computing device 104. Physical object 102 may include a NFC chip configured to communicate with seller computing device 104. Once the marketplace has verified ownership of both physical object 102 and the linked NFT, the marketplace may list physical object 102 for sale.

A buyer may connect a buyer computing device 112 with the marketplace API 106 utilizing network 110 to purchase physical object 102. The marketplace will oversee the transaction to ensure the buyer receives physical object 102 and the linked NFT. In some embodiments, the buyer or a third party (e.g., the marketplace itself) may verify the authenticity of physical object 102 prior to completing the transaction. The verification process helps prevent the sale of counterfeits goods. For example, the verification step prevents a seller from creating a listing with an authentic good and then shipping counterfeit goods to the buyer. After verifying the authenticity of physical object 102, the marketplace may transfer ownership of the NFT to the buyer and release the purchasing funds to the seller.

One benefit of the embodiments described herein is that it reduces the chance of a counterfeit sale by enforcing NFC authentication and utilizing NFTs. To make a listing, the marketplace subjects sellers to follow a rigorous two factor system that authenticates the digital item and the physical object to achieve minimal risk of counterfeit items. This also introduces the typical benefits provided by a NFT ecosystem, such as royalties, provable and enforced transactions, and access to unique perks that can only be unlocked via ownership of the entangled item.

Figure 2:
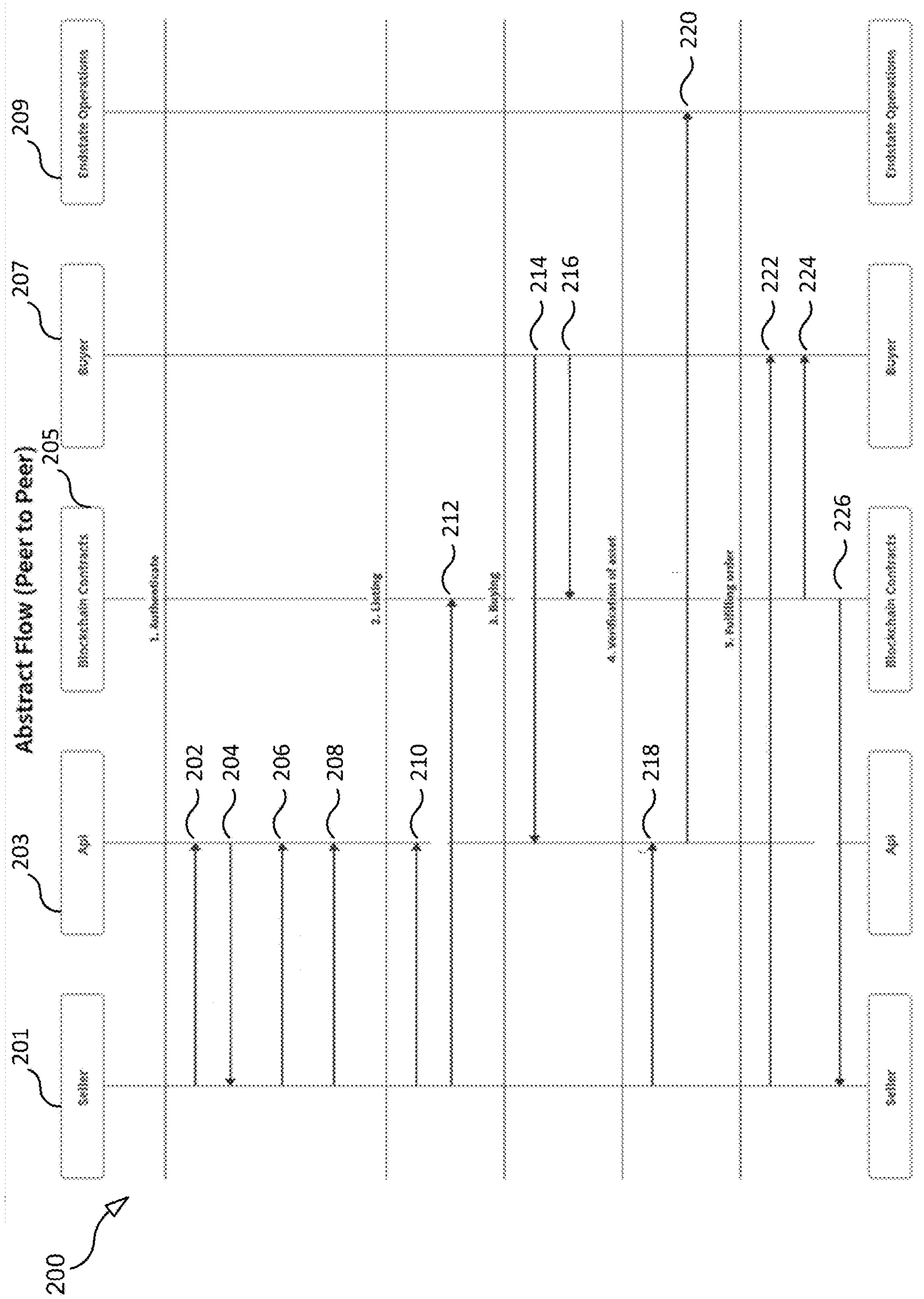
FIG. 2 is a sequence diagram illustrating a method for transferring rights according to some embodiments.

FIG. 2 is a sequence diagram illustrating a method for transferring rights to a physical object with a linked digital good (e.g., NFT) according to some embodiments. Method 200 begins with step 202 as part of an authentication process. The authentication process validates that the seller 201 owns both the physical object and the linked NFT. A seller 201 may be required authenticate the physical object prior to listing the object for sale on the marketplace. At 202, a seller 201 (e.g., seller computing device 104) may connect their crypto wallet with API 203 (e.g., marketplace API 106). The marketplace may prove ownership of the wallet via asymmetric key cryptography. A crypto wallet is a self-custodied digital wallet used to store and manage cryptocurrencies and NFTs.

At 204 and 206, API 203 provides a message for seller 201 to sign and seller 201 sign the message to prove ownership of the wallet and ownership of the NFT. The marketplace may confirm seller 201 owns the NFT by comparing the address of the wallet with the address associated with the NFT listed in a blockchain. In some embodiments, to sign a message, seller 201 creates a hash of the message. A hash is a fixed-size string of bytes that uniquely represents the data (the message). This hash acts as a digital fingerprint of the message. The content of the message may be provided by an external party (e.g., API 203) that wishes seller 201 to prove its identity. Seller 201 may then encrypt this hash with their private key. This encrypted hash is the digital signature.

In some embodiments, API 203 may verify the signature. API 203, upon receiving the message and the signature, may first compute the hash of the message again, using the same hashing algorithm. API 203 may then decrypt the digital signature using seller's 201 public key. This reveals the hash value calculated by seller 201. If the hash value computed by API 203 matches the hash value decrypted from the digital signature, it proves that the message has not been altered and that it was indeed signed by the owner of the private key, thereby confirming seller's 201 identity. This process ensures the integrity of the message, as any change in the message after it was signed would result in a different hash, making the verification fail. It also confirms the authenticity, as only seller 203 (who possesses the private key) could have created the digital signature.

At 208, seller 201 may scan the NFT chip in the physical object to prove ownership of the object. After steps 202-208, the marketplace may verify that seller 201 owns both the physical object and the linked NFT. After verification is complete, seller 201 may list the physical item on the marketplace. At 210, seller 201 may transmit a message to API 203 indicating they wish to list the physical item and NFT on the marketplace When seller 201 submits the entangled good (i.e. the physical object with the linked NFT) to be sold, they may include appropriate details including price, condition of physical object, and images of physical object. At 212, the seller 201 may move the NFT into escrow via a blockchain contract 205. In some embodiments, seller 201 may either submit the NFT into escrow at this point or submit a "right to transfer" the NFT to the marketplace upon a successful purchase.

In some embodiments, seller 201 may optionally choose to delist their physical object once it has been listed.

A buyer 207 may browse the marketplace and choose to purchase an entangled good listed. Once seller 201 has created the listing, buyer 207 (e.g., buyer computing device 112) may view the listing and transmit a message to API 203 indicating they wish to purchase the object. In order to purchase, buyer 207 may submit funds at the listed price into escrow. At 216, buyer 207 may move funds for purchasing the item into escrow via a block chain contract 205. In some embodiments, the buyer 207 may not be required to submit funds into escrow prior to proceeding with the purchasing process.

Once the funds and NFT are both in escrow, the physical item may be shipped and inspected. The inspection can be performed by the marketplace or buyer 207 upon receiving the item. In a non peer-to-peer structure, the marketplace may ship the physical object to buyer 207 after inspection. Here, seller 201 may ship the physical object to the marketplace after buyer 207 has requested to purchase the object. The marketplace will then inspect the physical object to ensure its authenticity and to ensure the item meets quality standards. Upon completion, the marketplace may then ship the physical item to buyer 207 and fulfill the trade.

In the peer-to-peer structure, the physical object may be delivered to buyer 207 prior to inspection. Here, the marketplace no longer manually performs inspections. Instead, seller 201 and buyer 207 are empowered to perform their own authenticity checks with tools provided by the marketplace. Thus, seller 201 may ship the item directly to buyer 207, and buyer 207 can send funds to seller 201 via smart contract. Smart contracts are simply programs stored on a blockchain that run when predetermined conditions are met.

In the present embodiment, the inspection may include seller 201 submitting photos of the item to API 203 which may be forwarded to Endstate operations (i.e. the owners of the marketplace) 209 at 220. The photos may be used with machine learning to verify a quality level of the object. The physical object may pass inspection when the quality level exceeds a quality threshold. The quality threshold may be based on the listing of the object. For example, if the listing provides the object is "like new," the inspection may requires the physical object to have a high quality level with few blemishes.

Upon successful quality checks and inspection, the marketplace or buyer 207 may "fulfill" the item, thereby releasing the digital NFT to buyer 207 and the funds to seller 201. In the present embodiment, seller 201 may ship the physical item to buyer 207 at 222. Blockchain contracts may also release the NFT to buyer 207 at 224 and release the funds to seller 201 at 226. At this point, ownership rights of both the physical object and NFT have been transferred to buyer 207.

Figure 3:
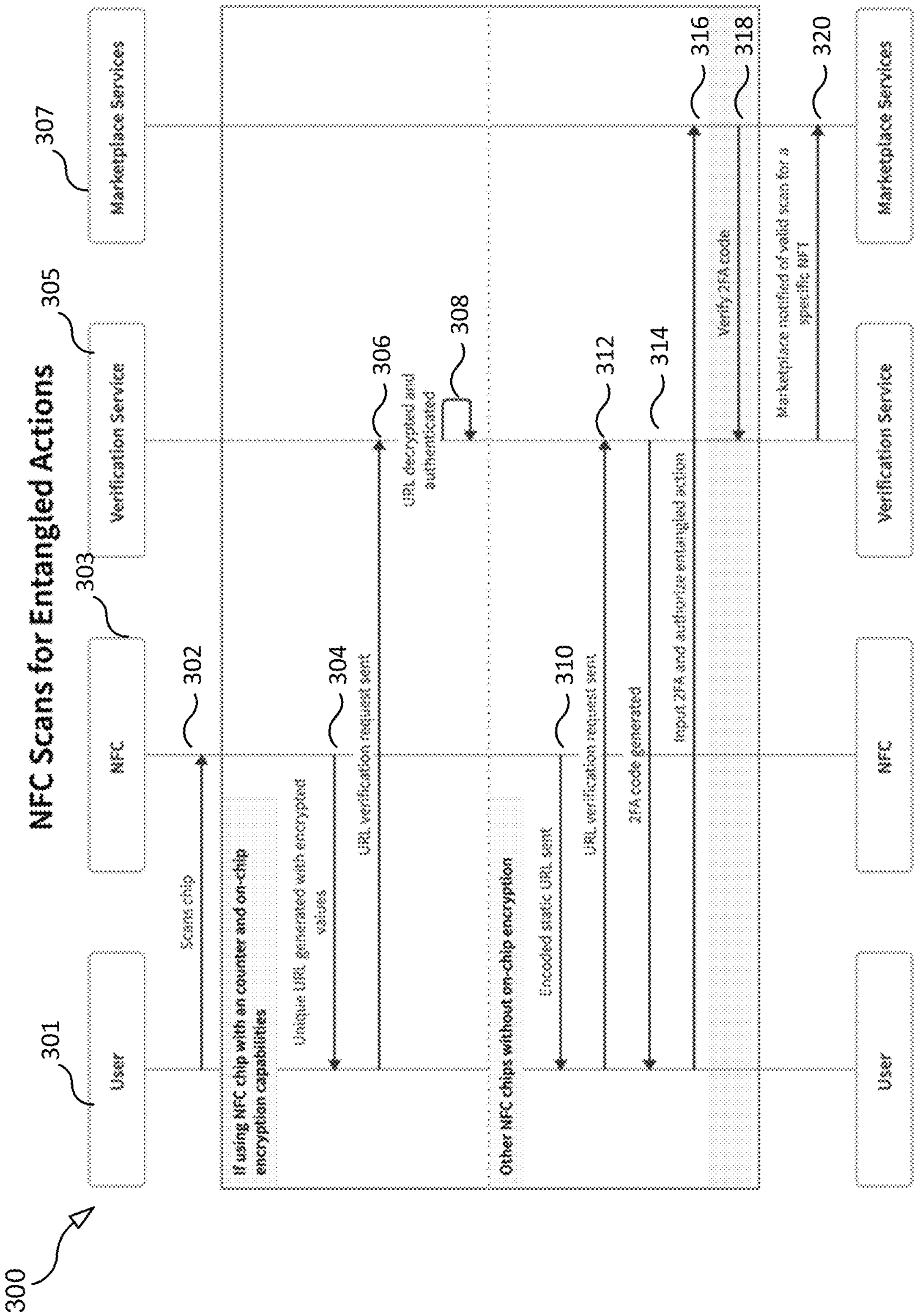
FIG. 3 is a sequence diagram illustrating a method for verifying ownership of a physical object according to some embodiments.

FIG. 3 is a sequence diagram illustrating a method for verifying ownership of a physical object according to some embodiments. FIG. 3 provides additional embodiments describing how the marketplace may verify that a potential seller owns the physical object. Method 300 may begin with step 302.

At 302, a user 301 may scan a NFC chip 303 of a physical object. The physical object may have NFC chip 303 embedded inside itself or attached to itself. NFC chip 303 may be encoded for a specific physical object. NFC chip 303 may have logic that can communicate with the marketplace via an internet connection to authorize an entangled action. By scanning the chip, the marketplace is able to prove that the physical object is owned by the user performing the scanning. The authentication steps may be different depending on the feature set which the NFC chip 303 supports.

In some embodiments, NFC chip 303 may include a counter and on-chip encryption capabilities. Here, the NFC chip may communicate with external services via a secret URL. NFC chip 303 may respond to the scanning with a unique URL generated with encrypted values at 304. At 306, user 301 may send a URL verification request to a verification service 305. In some embodiments, verification service 305 may be provided by a third party. At 308, verification service 305 may decrypt the URL and authenticate NFC chip 305 of the physical object.

In some embodiments, NFC chip 303 may not include on-chip encryption. Here, NFC chip 307 may provide a "two-factor authentication like" experience with a temporary code to prove ownership. NFC chip 303 may respond to the scanning by transmitting an encoded static URL to user 301 at 310. At 314, user 301 may transmit a URL verification request message to verification service 305. Verification service 305 may respond by transmitting a two factor authentication ("2FA") code to the user 301 at 314. At 316, user 301 may input the 2fA code and authorize entangled action with marketplace services 307. Marketplace services 307 may then transmit a verify 2FA code to verification service 305 at 318.

After steps 308 and 318, verification service 305 has confirmed the validity of NFC chip 303 and may notify marketplace services 305 of a valid scan of a specific NFC chip and NFT at 320.

Figure 4:
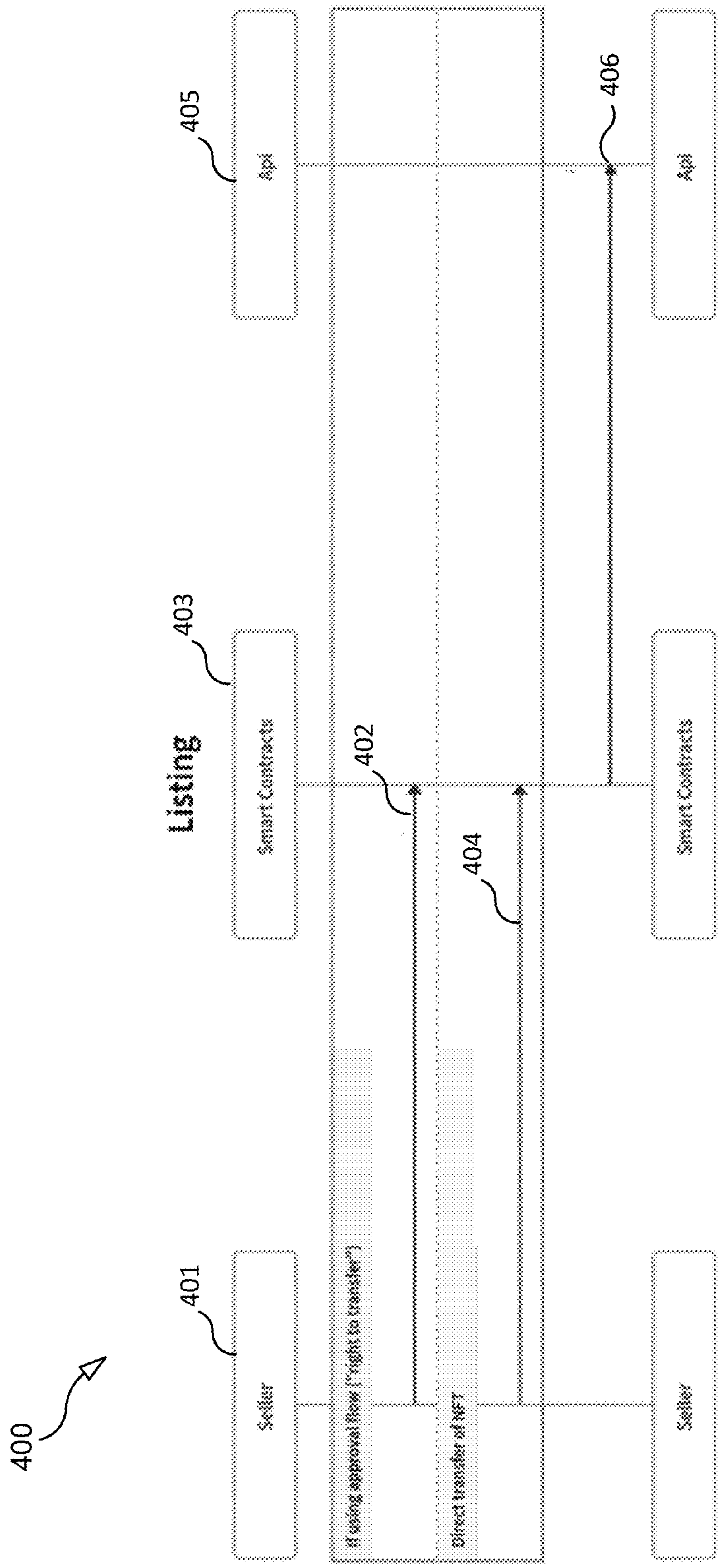
FIG. 4 is a sequence diagram illustrating a method for listing a physical object for sale according to some embodiments.

FIG. 4 is a sequence diagram illustrating a method for listing a physical object for sale according to some embodiments. FIG. 4 provides additional embodiments describing how a user may list a physical object on the marketplace.

When a user creates a listing, they may connect their digital or hardware blockchain/cryptocurrency wallet to the marketplace to confirm they own the NFT. Once a user connects their wallet, the wallet's public key may be retrieved and compared against the owner of the relevant NFT. The marketplace may retrieve the owner of the relevant NFT from a blockchain. If the identifier of the wallet matches the owner of the NFT, the user can be said to own the NFT. To confirm a listing, a user may be prompted to provide an appropriate signed transaction with their wallet (and thereby their private key) to provide proof of ownership.

Additionally, the user will be prompted to scan a NFC chip (or otherwise identify) in the physical object that corresponds to the NFT digital asset. The NFC scan may trigger a verification by making an API call to the marketplace databases to check the metadata of the NFT and its entangled physical counterpart. The marketplace may verify the scanned NFC chip is linked with the relevant NFT. In some embodiments, the user must scan the NFC chip (or otherwise identify) the physical object within a certain period of time since the NFT was authenticated. If the physical object is not confirmed (i.e. not scanned) within the given time frame the listing may be canceled.

In some embodiments, physical objects listed as lost or stolen may not be eligible for listing. The marketplace may maintain a list of stolen physical objects or may receive the list from another computing device. Also, NFTs that have not been redeemed may not have a physical counterpart and may not be eligible for listing on the marketplace. For example, an NFT linked with a physical object that has not been released for sale yet may not be eligible for listing.

By first connecting their wallet with the NFT, then confirming their ownership of the corresponding physical object, the user may authenticate their ownership of the "entangled" object. In some embodiments, the user may first confirm their ownership of the physical object and then authenticate their ownership of the corresponding NFT.

Once the user proves they own both the NFT and the physical object, the listing may be created. Creating a listing may involve adding metadata about the condition of the physical object, the expected sale price, the length of time the listing would be available, and recent photos of the physical object. In some embodiments, this metadata may be sent to a database and the corresponding images are uploaded to cloud storage via the marketplace API. Each image and the metadata can be verified by the marketplace administrators.

In some embodiments, the marketplace listing may show pictures of both the physical object and the NFT, and may state that both components are for sale.

Referring back to FIG. 4, method 400 may begin with step 402. In some embodiments, upon creation of the listing, the NFT may be transferred to a secure escrow marketplace contract 403 at 402. The NFT may be locked into the escrow marketplace contract and may no longer be available to the owner's crypto wallet.

In some embodiments, at 404, the NFT is not directly moved into the escrow contract, but rather a "right to transfer" contract 403 may be given, so that upon purchase the item can be moved into escrow. In some embodiments, the NFT may not be required to be moved into escrow or a "right to transfer" contract may not be required to proceed with the listing process. A transfer of rights agreement is a contract by which the transfer of ownership of an immaterial good and the rights attached to it takes place.

After steps 402 and 404, any data related to the NFT required to present the appropriate details to buyers in a web application may be transmitted to an API 405 at 406.

Figure 5:
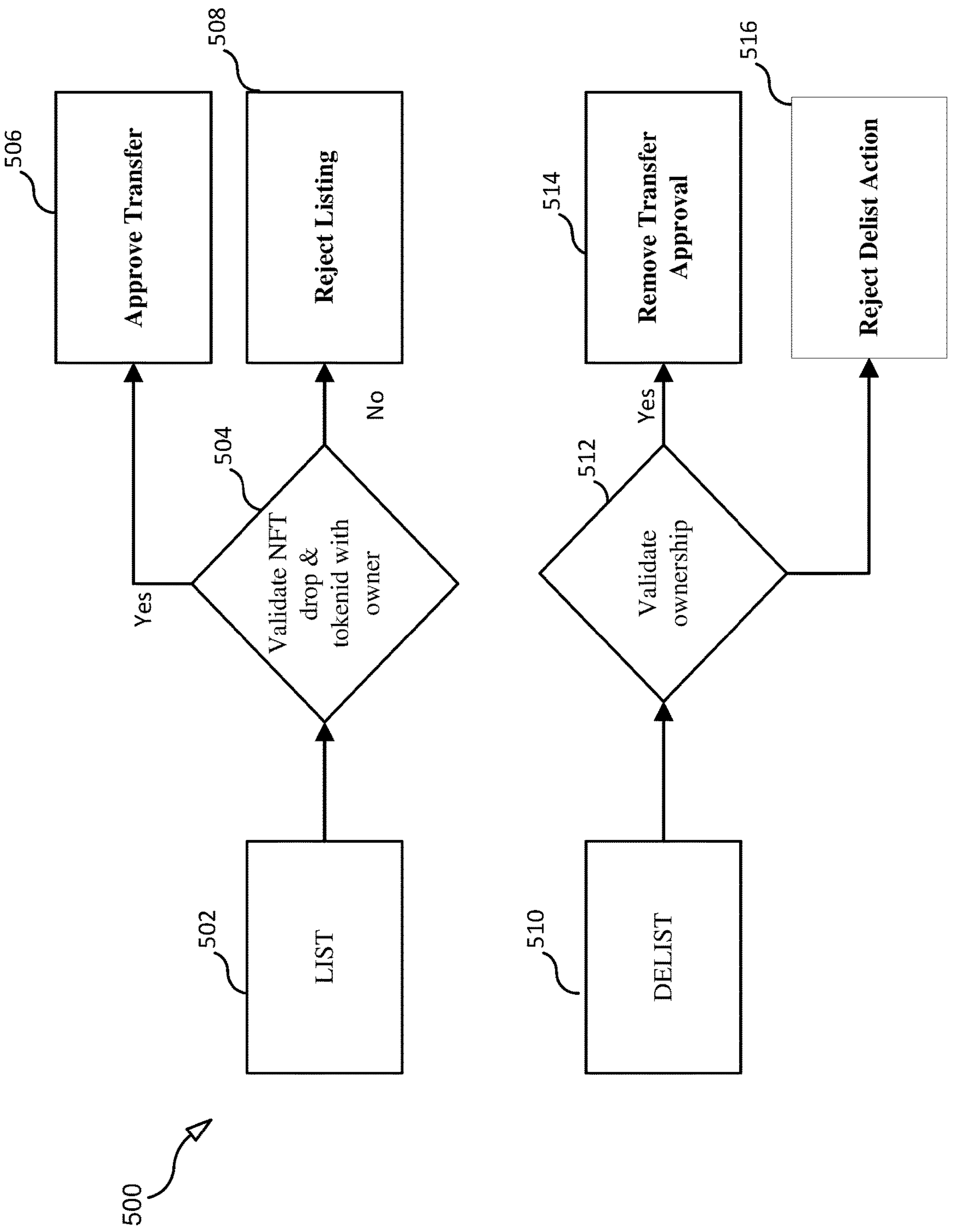
FIG. 5 is a block diagram illustrating a method for listing and delisting a physical object according to some embodiments.

FIG. 5 is a block diagram illustrating a method for listing and delisting a physical object according to some embodiments. The marketplace may perform method 500 when deciding whether to list or delist an item. Method 500 may begin at step 502.

At 502, the marketplace may receive a request to list a physical object and its linked NFT from a user. At 504, the marketplace may determine whether it can validate the NFT drop and tokenId with the user who requested to list the object. If the marketplace is able to validate, method 500 proceeds to step 506 and approves the transfer. If the marketplace is unable to validate, then method 500 proceeds to step 508 and rejects the listing.

At 510, the marketplace may receive a request to delist a physical object and its linked NFT from a user. At 512, the marketplace may validate whether the user who requested the delisting owns the corresponding physical object and NFT. If the user is also the owner, method 500 proceeds to step 514 and removes transfer approval. If the user is not also the owner, the method 500 proceeds to step 516 and rejects the delisting action.

Figure 14:
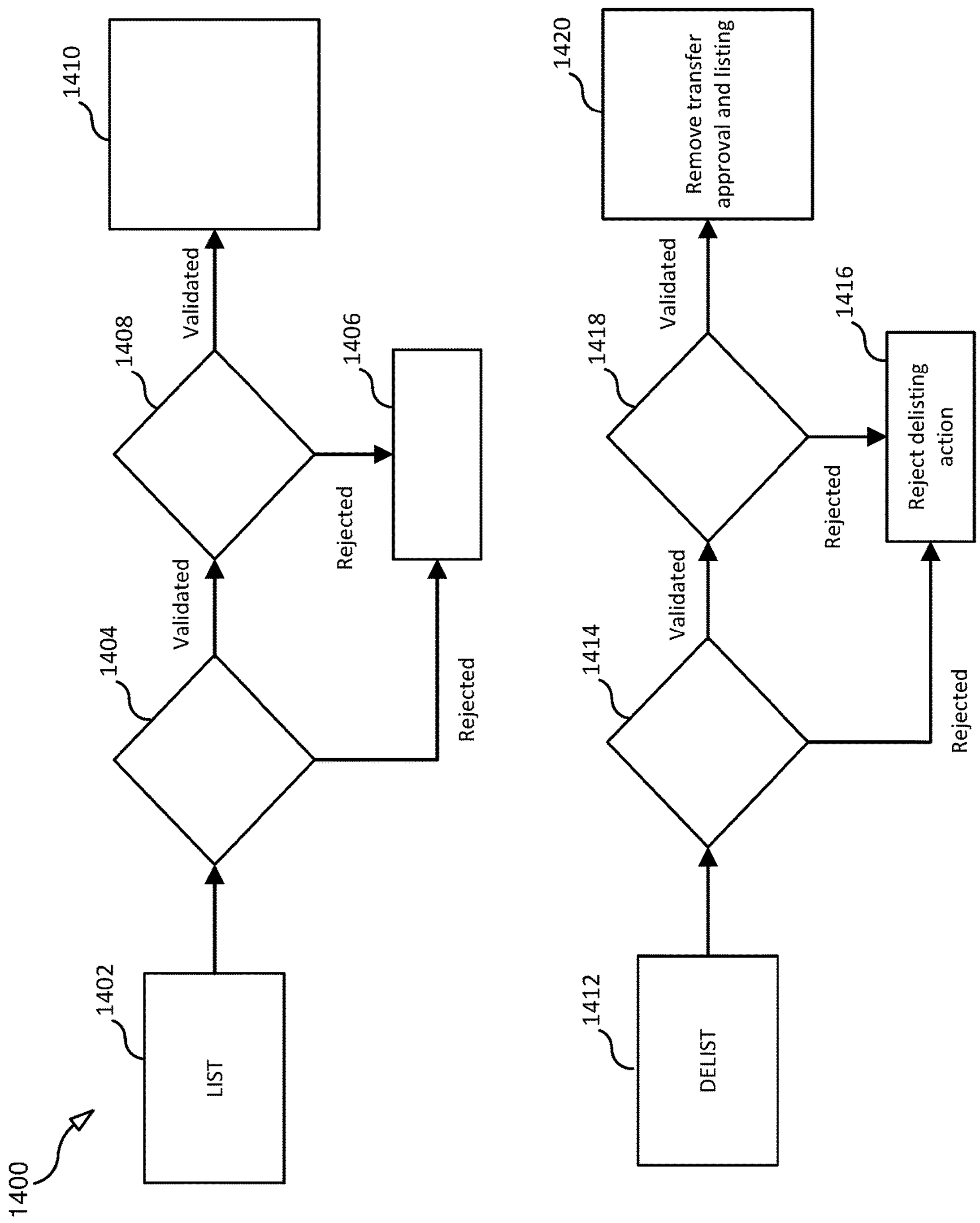
FIG. 14 is a block diagram illustrating a method for listing and delisting a physical object according to some embodiments.

FIG. 14 is a block diagram illustrating a method for listing and delisting a physical object according to some embodiments. The marketplace may perform method 1400 when deciding whether to list or delist an item. Method 1400 may begin at step 1402.

At 1402, the marketplace may receive a request to list a physical object and its linked digital asset from a user. At 1404, the marketplace may validate ownership and authenticity of the physical object via an NFC scan or another mechanism. If the marketplace cannot validate ownership and authenticity of the physical object, then method 1400 proceeds to step 1406 rejecting the listing. If the marketplace can validate ownership and authenticity of the physical object, then method 1400 proceeds to step 1408. At 1408, the marketplace may validate the ownership and authenticity of the digital asset. If the marketplace cannot validate the ownership and authenticity, then method 1400 proceeds to step 1406 rejecting the listing. If the marketplace can validate ownership and authenticity of the digital asset, then method 1400 proceeds to step 1410 and accepts the listing.

At 1410, the marketplace may receive a request to delist a physical object and its linked digital asset from a user. At 1414, the marketplace may validate ownership and authenticity of the physical object via an NFC scan or another mechanism. If the marketplace cannot validate ownership and authenticity of the physical object, then method 1400 proceeds to step 1416 rejecting the delisting action. If the marketplace can validate ownership and authenticity of the physical object, then method 1400 proceeds to step 1418. At 1418, the marketplace may validate the ownership and authenticity of the digital asset. If the marketplace cannot validate the ownership and authenticity, then method 1400 proceeds to step 1416 rejecting the delisting action. If the marketplace can validate ownership and authenticity of the digital asset, then method 1400 proceeds to step 1420 and removes transfer approval and removes the listing.

Figure 6:
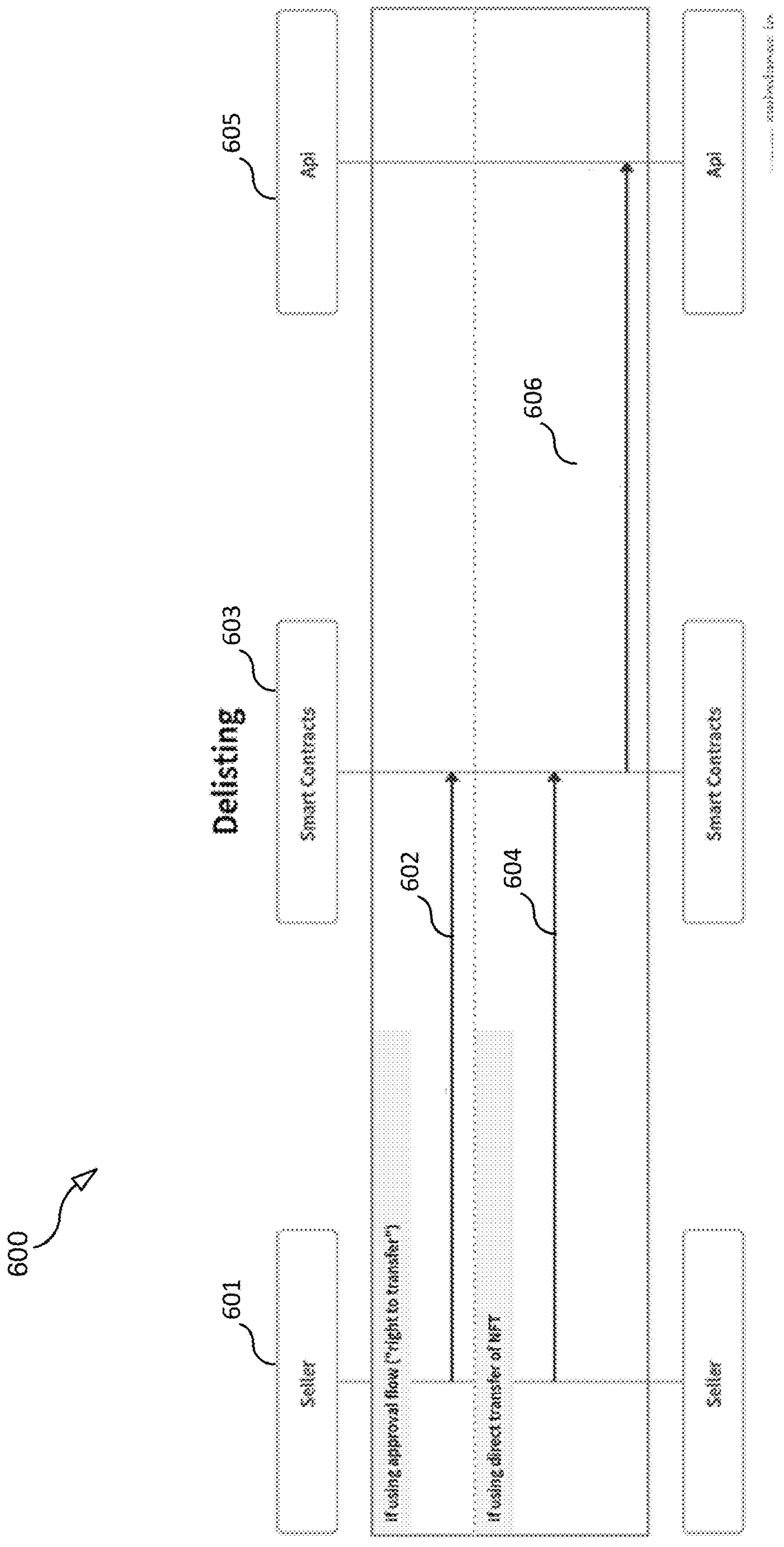
FIG. 6 is a sequence diagram illustrating a method for delisting a physical object according to some embodiments.

FIG. 6 is a sequence diagram illustrating a method for delisting a physical object according to some embodiments. FIG. 6 provides additional embodiments describing how a user may delist a physical object on the marketplace.

If the seller cancels the listing before any sale has occurred, the NFT may be returned back to the original wallet address, the escrow funds and NFT released from the marketplace contract. The releasing of any funds from the escrow account may be done simultaneously with the returning of the NFT to the original owner's wallet. The seller may be unable to initiate a cancellation of the sale if there is a transaction in progress such as a sale, a dispute or the item has been marked as stolen or fraudulent.

At 602, if the seller 601 has listed via a "right to transfer", the delisting operation may be removing of this "right to transfer" contract 603 from the marketplace. This effectively reverses the initial listing action.

At 604, if the seller 601 has transferred the NFT into escrow, the delisting operation may be removing the NFT from escrow 603.

After steps 602 and 604, API 605 may remove and make adjustments to web services to effectively removing the listing from the application at 606.

Figure 7:
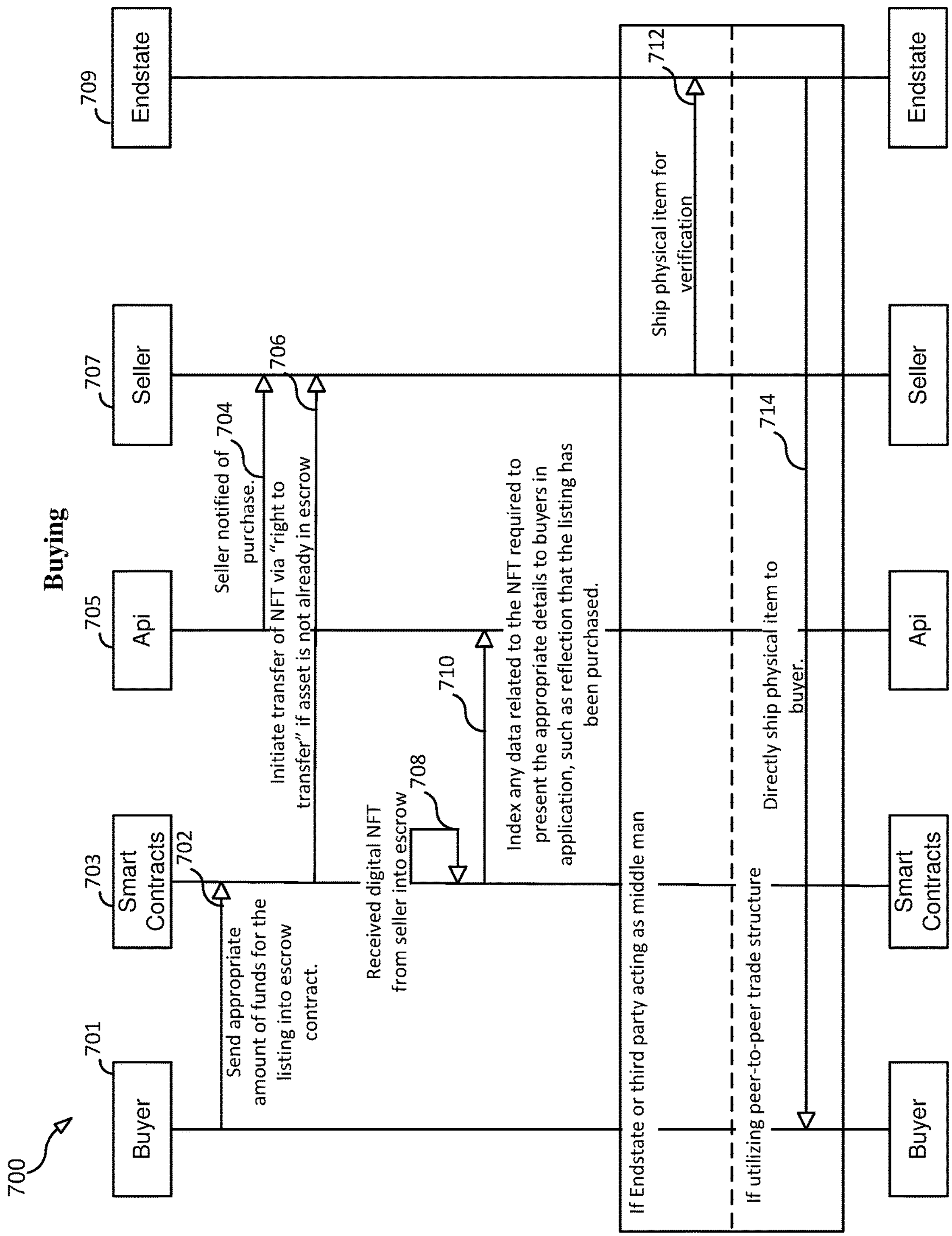
FIG. 7 is a sequence diagram illustrating a method for buying a physical object according to some embodiments.

FIG. 7 is a sequence diagram illustrating a method for buying a physical object according to some embodiments. FIG. 7 provides additional embodiments describing how a user may purchase a physical object on the marketplace. Method 700 may begin with step 702.

At 702, a buyer 701 may send an appropriate amount of funds for the listing into escrow contract 703. A successful purchase operation occurs when buyer 701 has sent the appropriate amount of funds into escrow 703. The amount is sent into the marketplace escrow account and should cover the cost of the sale as well as any processing fees and shipping costs. The money and NFT are not immediately released to buyer 701 and seller 707, but is held for a duration in escrow until physical object condition is verified by the marketplace or buyer 701.

After the funds are received, an API 705 may notify seller 707 of the purchase at 704. At 706, the smart contact 703 may initiate a transfer of the NFT via "right to transfer" if the NFT has not already been transferred into escrow.

At 708, smart contract 703 receives the digital NFT from seller 707 into escrow. At 710, API 705 may index any data related to the NFT required to present the appropriate details to buyer in application, such as reflecting that the listing has been purchased In some embodiments, the marketplace, or another third party, may act as a middle man between buyer 701 and seller 707. Here at 712, seller 707 may ship the physical object to marketplace 709 for verification. In some embodiments, a peer-to-peer trade structure may be implemented. Here, at 714, seller 707 may directly ship the physical object to buyer 701.

Figure 8:
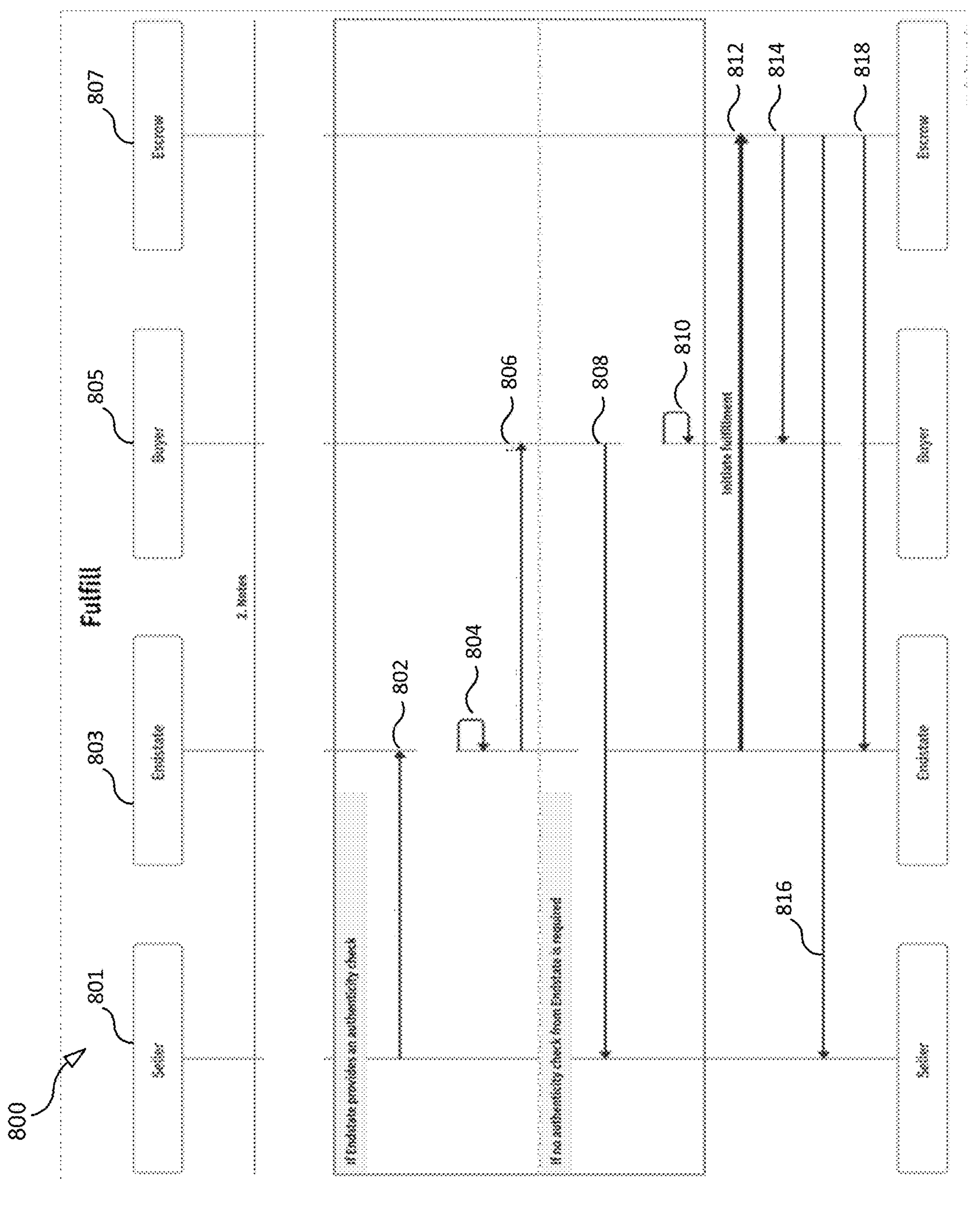
FIG. 8 is a sequence diagram illustrating a method for fulfilling a purchase according to some embodiments.

FIG. 8 is a sequence diagram illustrating a method for fulfilling a purchase according to some embodiments. FIG. 8 provides additional embodiments describing fulfilling the purchase of a physical object on the marketplace. Method 800 may begin with step 802.

In some embodiments, the marketplace, or a third party to the transaction may provide the authenticity check. Here at 802, a seller 801 may ship the physical object to the marketplace 803. In some embodiments, seller 801 may ship the physical object after a buyer 805 has completed the purchase. At 804, marketplace 804 may check the condition of the physical item. If the physical object passes inspection, then method 800 proceeds to 806 and ships the physical object to the buyer.

In some embodiments, the physical condition of the object may be confirmed by taking multiple pictures or having a third party ascertain the condition of the object.

In some embodiments, buyer 805 may be required to transfer some cryptocurrency into the escrow contract to be held as collateral until the physical object's condition has been ascertained by a third party, artificial intelligence, or the marketplace administrator.

In some embodiments, marketplace 803 may not be involved in the authenticity check. Here, at 808, seller 801 may send the physical object to the buyer 805 after buyer 805 has purchased the object. Buyer 805 may then check the condition of physical object at 810. In some embodiments, buyer 805 may check the condition of the physical object using tools provided by marketplace 803.

In some embodiments, the physical condition of the object may be confirmed by optical scans or by analysis of images of the physical object by artificial intelligence. The funds contained in the escrow contract would not be released to seller 801 until buyer 805 has received the item and confirms the condition of the physical item matches the initial description, either by their own inspection, or by taking optical scans or photographs of the item, to be inspected by a third party or artificial intelligence.

In the peer-to-peer structure, marketplace 803 may provide tools to help perform quality checks on physical items.

These tools may include:

- Computer vision tools to ensure the physical object is in the correct condition. For example, buyer 805 may take photos of the physical object and submit them to marketplace 803 servers for verification.
- Services that integrate with shipment providers to automatically detect status of the shipment of the physical object.
- Other shipment tracking methods such as long range wide area network ("LoRaWAN") on parcels and other similar tracking mechanisms to ensure successful delivery.
- NFC chip scans to ensure the correct physical object has been sent or received.
- Tamper-proof shipping boxes that automatically detect tampering.
- NFTs, which by definition, ensure digital good authenticity via the blockchain.

In some embodiments, the main characteristics of the physical that must be qualified by buyer 805 are the following:

- That the physical object is correctly delivered (e.g., not lost in transit).
- Physical object condition.
- Physical object authenticity.
- NFT authenticity.

Upon successful inspection, the marketplace may subsequently release both the funds and the NFT from escrow to "fulfill" the trade. By postponing the release of assets from escrow until the end, the buyer and seller are incentivized not to cheat each other as the funds from the buyer are at stake for the seller and the NFT (and therefore the legitimacy of the physical item) are at stake for the buyer.

After steps 806 and 810, where the condition of the physical object passes inspection, marketplace 803 may initiate fulfillment 812 with escrow 807. At 814, escrow 807 releases the NFT to buyer 805. At 816, escrow 807 releases the purchasing funds to seller 801. At 818, escrow 807 transmits the fee associated with the sale to marketplace 803.

In some embodiments, in the event of any dispute between the seller and the buyer, final arbitration may be performed by the marketplace administrator. The dispute between the buyer and seller may also be resolved by a third party by binding arbitration. The dispute may be resolved by an analysis of the conditions of the physical item, performed by artificial intelligence, and based on images or optical scans of the physical item.

The marketplace may be configured to list for sale any external brand. External brands being brands (e.g., clothing or sneakers) not initially created by the marketplace or the owners of the marketplace. As the use of digitally twinned NFC chipped physical goods rises, the marketplace creates an interface by which external brands can automatically be supported to be bought and sold on the marketplace. In some embodiments, the external brand may adhere to two facts to provide entangled items:

A. The NFC chip on the physical item must verify the legitimacy of the good at some point during or after the chip interaction.

B. The brand must have some way to retrieve information relating the physical good to the digital good. The brand may provide their own API services or will use an external service to do so.

The marketplace may utilize these facts to support the listing of items from these external brands. In some embodiments, the marketplace may provide a scanner or similar tool to interact with the chip. The marketplace may, however, leave the authentication implementation details up to the external brand. By doing so, the marketplace is able to flexibly work with the majority of NFC-chipped goods.

Figure 9:
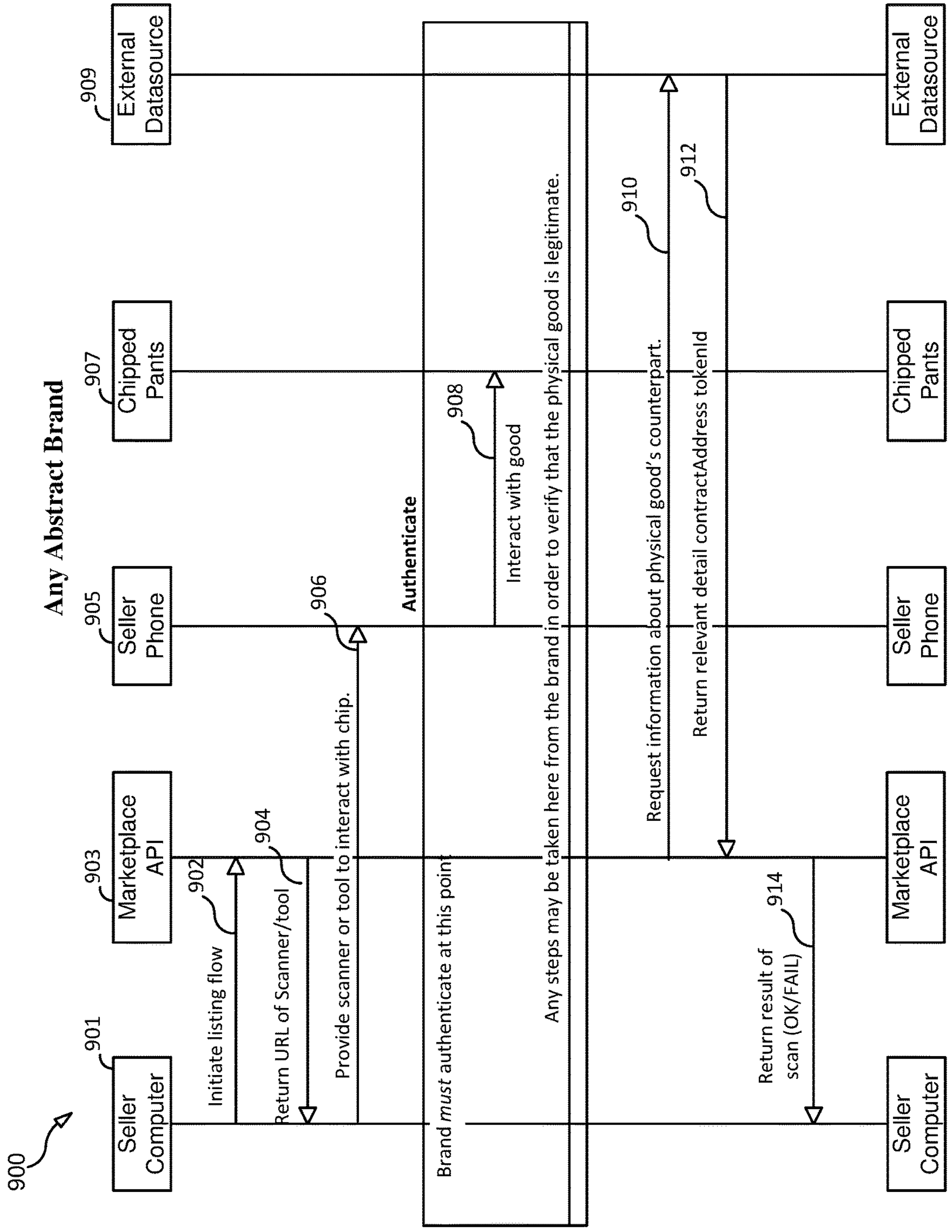
FIG. 9 is a sequence diagram illustrating a method for listing a physical object according to some embodiments.

FIG. 9 is a sequence diagram illustrating a method for listing a physical object according to some embodiments. Method 900 illustrates a high level flow of where an external brand's verification step can fit in. Method 900 may begin with step 902.

At 902, a seller computer 901 may initiate a listing flow with a marketplace API 903. Marketplace API 903 may return the URL of a scanner or tool at 904. At 906, the seller computer may provide the scanner or tool to interact with the NFC chip to a seller phone 905. At this point, the brand may begin authentication. At 908, seller phone 908 may interact with the good 907 (e.g., chipped pants). Here, any steps may be taken from the brand in order to verify that the physical goods are legitimate. Afterwards at 901, marketplace API 903 may request information about the physical good's counterpart from an external data source 909. External data source 909 may return relevant details (e.g., contract address and/or tokenID) to marketplace API 903 at 912. At 914, marketplace API may return the result of the scan (e.g., an indication of acceptance or failure) to seller computer 901.

Figure 10:
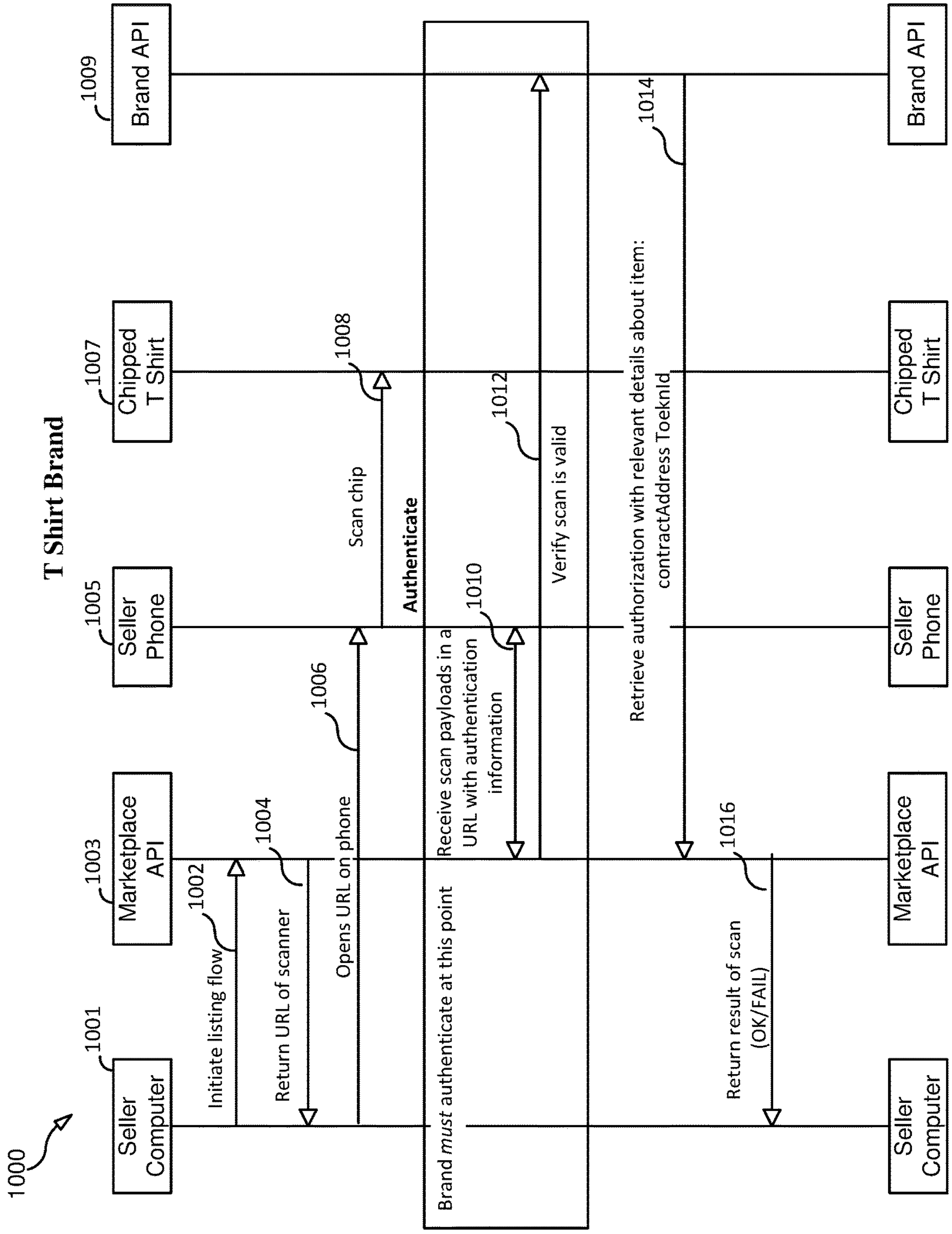
FIG. 10 is a sequence diagram illustrating a method for listing a shirt according to some embodiments.

FIG. 10 is a sequence diagram illustrating a method for listing a shirt according to some embodiments. In method 1000, this brand's products utilize an authentication step that is achieved via the passing of a URL with an encrypted payload and a scan count derived from the on-chip counter. At 1010, marketplace API 1003 and seller phone 1005 may exchange scan payloads in a URL with authentication information. This payload is used to uniquely identify the chip (and therefore the physical item) and the scan on the brand API 1009. The information to link the digital good to the physical item is provided by brand API 1009. The marketplace queries this API with the payload from the chip. At 1012, marketplace API 1003 may verify with a brand API 1009 that the scan is valid.

Figure 11:
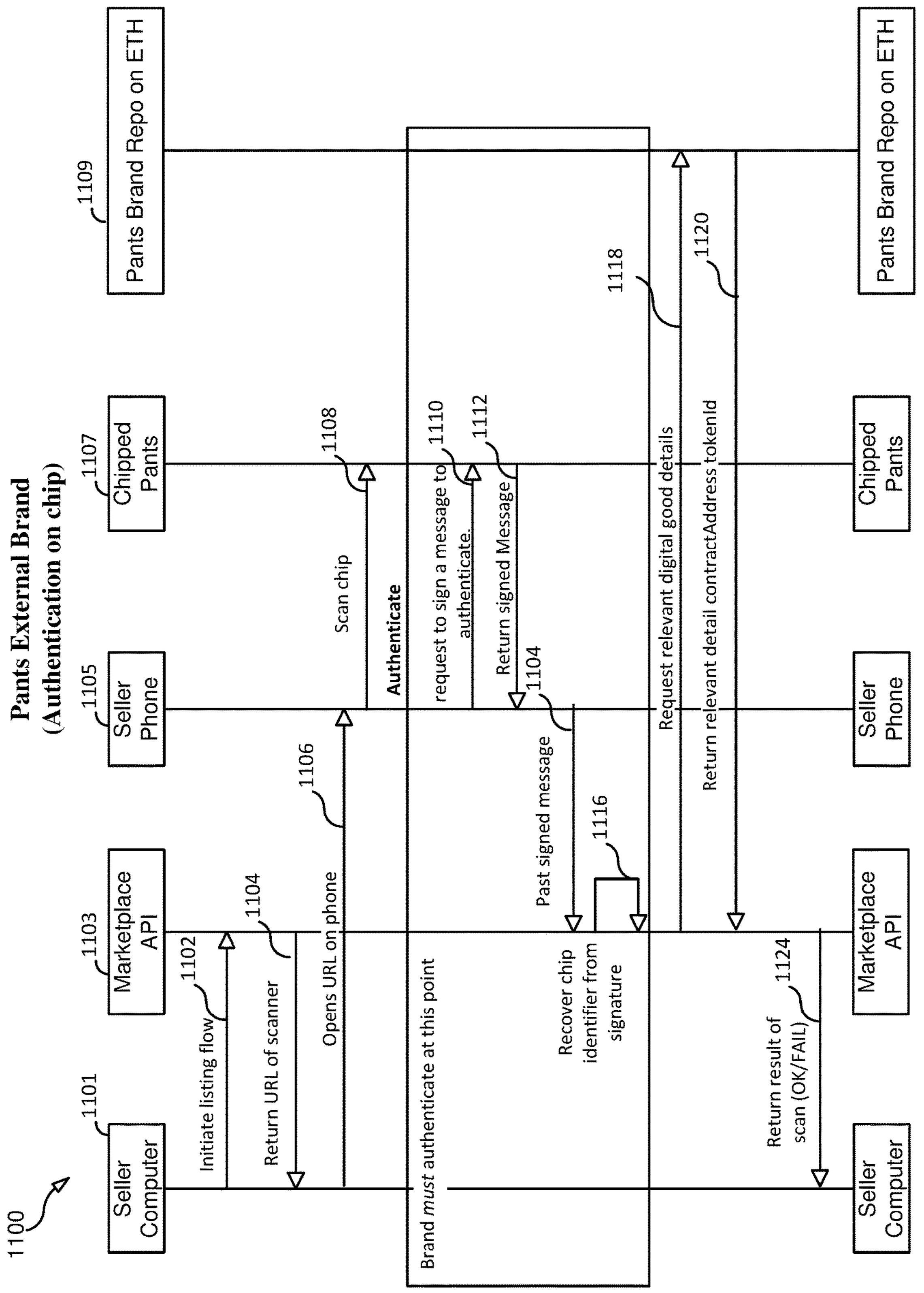
FIG. 11 is a sequence diagram illustrating a method for listing pants according to some embodiments.

FIG. 11 is a sequence diagram illustrating a method for listing pants according to some embodiments. In method 1100, this brand's chips are specially equipped to verify their identities through the use of a signed message on the chip. Here, provided scanner on the seller's phone will prompt the chip to sign a message. At 1110, seller phone 1105 may request a good 1107 to sign a message to authenticate the good 1107 (e.g., chipped pants). Good 1107 may respond with the signed message at 1112. At 1114, seller phone 1105 may pass the signed message to marketplace API 1103. Afterwards, marketplace API 1103 may query a public registry on the marketplace provided by Pants Brand using the recovered chip id to retrieve the linkage between physical and digital at 116.

Figure 12:
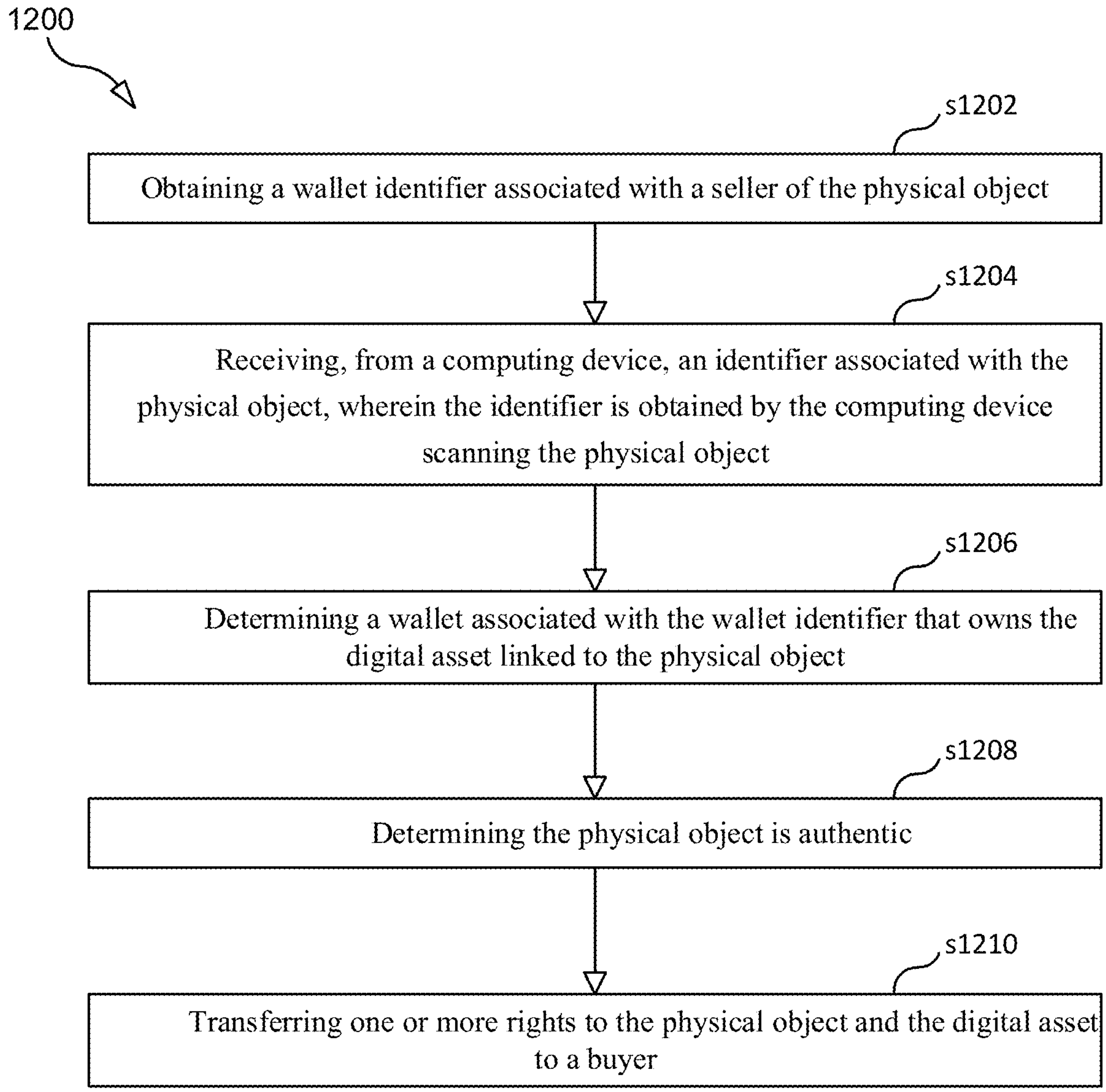
FIG. 12 is a flow chart illustrating a process according to some embodiments.

FIG. 12 is a flow chart illustrating a process according to some embodiments. Process 1200 is a computer-implemented method for transferring rights of a physical object with a digital asset. Referring now to FIG. 12, process 1200 may begin with step s1202.

Step s1202 comprises obtaining a wallet identifier associated with a seller of the physical object.

Step s1204 comprises receiving, from a computing device, an identifier associated with the physical object. The identifier is obtained by the computing device scanning the physical object.

Step s1206 comprises determining a wallet associated with the wallet identifier that owns the digital asset linked to the physical object.

Step s1208 comprises determining the physical object is authentic.

Step s1210 comprises transferring one or more rights to the physical object and the digital asset to a buyer.

In some embodiments, the rights transferred to the buyer include one or more of: ownership rights, fractional ownership rights, temporary ownership rights, leasing, and renting.

In some embodiments, the physical object includes a near-field communication (NFC) chip and the identifier is obtained by the computing device scanning the NFC chip of the physical object.

In some embodiments, determining the physical object is authentic comprises: receiving an authentication message indicating the physical object includes the NFC chip, wherein the authentication message was transmitted by the buyer or a third party.

In some embodiments, the method includes receiving a signature of the wallet, wherein the signature indicates that the seller owns the wallet.

In some embodiments, the method includes generating a listing for the physical object as a result of determining the wallet owns the digital asset.

In some embodiments, the method includes moving the digital asset into an escrow wallet account or receiving an indication of a right to transfer smart contract related to the NFT.

In some embodiments, the method includes receiving a purchasing message transmitted from the buyer, wherein the purchasing message indicates the listing; and receiving a funds message, wherein the funds message indicates monetary funds were received by an escrow account or a transfer of funds smart contract was signed by the buyer.

In some embodiments, the method includes determining a quality of the physical object; and determining whether the quality of the physical object satisfies a quality threshold or the quality matches a description of the physical object.

In some embodiments, the method includes determining the quality of the physical object comprises analyzing one or more images of the physical object using a machine learning model.

In some embodiments, the method includes receiving a validation message, wherein the validation message indicates the seller has possession of the physical object.

In some embodiments, the rights are transferred as a result of receiving the validation message.

In some embodiments, the digital asset includes a cryptographic token.

In some embodiments, the cryptographic token is a non-fungible token (NFT).

In some embodiments, the physical object is one or more of: footwear, apparel, art, equipment, an event ticket, and a functional asset.

Figure 13:
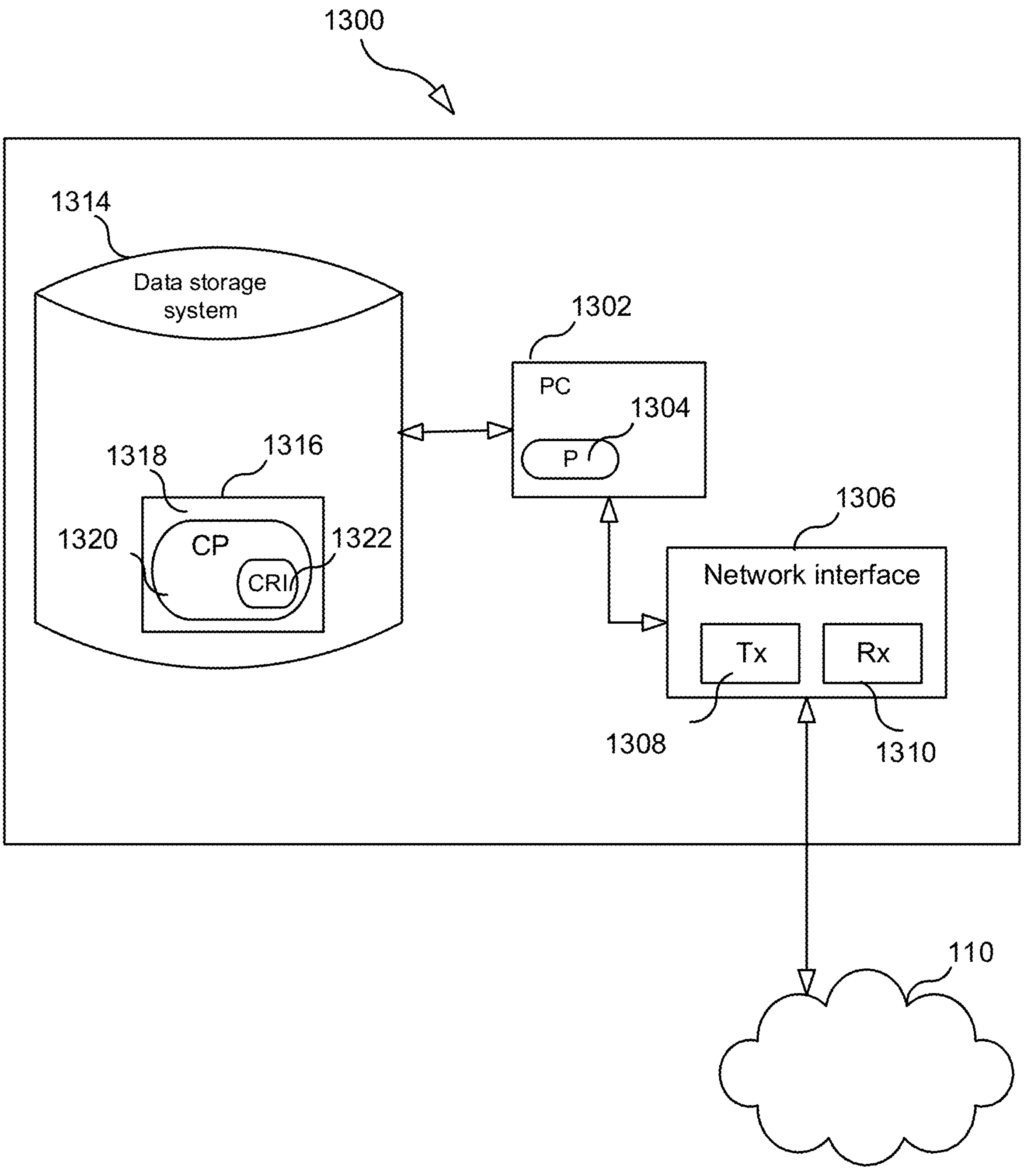
FIG. 13 is a block diagram of an apparatus according to some embodiments.

FIG. 13 is a block diagram of an apparatus 1300, according to some embodiments. As shown in FIG. 13, the apparatus may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like); a network interface 1348 comprising a transmitter (Tx) 1345 and a receiver (Rx) 1347 for enabling the apparatus to transmit data to and receive data from other computing devices connected to a network 1310 (e.g., an Internet Protocol (IP) network) to which network interface 1348 is connected; and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like.

In some embodiments, apparatus 1300 may comprise and/or perform the functions of any computing devices, APIs, and objects described in FIGS. 1-12. In some embodiments, the CRI 1344 of computer program 1343 is configured such that when executed by PC 1302, the CRI 1344 causes the apparatus 1300 to perform steps/functions described herein (e.g., steps/functions described herein with reference to FIGS. 2-12). In other embodiments, the apparatus 1300 may be configured to perform steps/functions described herein without the need for code. That is, for example, PC 1302 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method for transferring rights to a physical object with a digital asset, the method comprising:

obtaining a wallet identifier associated with a seller of the physical object;

receiving, from a computing device, an identifier associated with the physical object, wherein the identifier is obtained by the computing device scanning the physical object;

determining a wallet associated with the wallet identifier that owns the digital asset linked to the physical object;

receiving a signature of the wallet, wherein the signature indicates that the seller owns the wallet;

verifying, by the same computing device that scanned the physical object, that the signature is cryptographically bound to the identifier associated with the physical object, wherein verifying comprises validating that the signature was generated over data including the identifier;

determining the physical object is authentic;

generating, only upon successful verification of the cryptographic binding, a transfer authorization token that is valid for a single transfer of rights and expires after a predetermined time interval; and transferring one or more rights to the physical object and the digital asset to a buyer using the transfer authorization token, wherein the transferring is performed only upon presentation of the transfer authorization token while the transfer authorization token remains valid and unexpired. and wherein the transfer authorization token is invalidated upon completion of the single transfer.

2. The computer-implemented method according to claim 1, wherein the rights transferred to the buyer include one or more of: ownership rights, fractional ownership rights.

3. The computer-implemented method according to claim 1, wherein the physical object includes a near-field communication (NFC) chip and the identifier is obtained by the computing device scanning the NFC chip of the physical object.

4. The computer-implemented method according to claim 3, wherein determining the physical object is authentic comprises: receiving an authentication message indicating the physical object includes the NFC chip, wherein the authentication message was transmitted by the buyer or a third party, and wherein the authentication message includes a cryptographic proof that the NFC chip responded to a challenge generated by the computing device.

5. The computer-implemented method according to claim 1, further comprising:

generating a listing for the physical object as a result of determining the wallet owns the digital asset, and only after verifying the cryptographic binding between the wallet signature and the identifier associated with the physical object.

6. The computer-implemented method according to claim 5, further comprising:

moving the digital asset into an escrow wallet account or receiving an indication of a right to transfer a smart contract related to the NFT, wherein the escrow wallet account is unlocked only upon presentation of the transfer authorization token.

7. The computer-implemented method according to claim 6, further comprising:

receiving a purchasing message transmitted from the buyer, wherein the purchasing message indicates the listing; and receiving a funds message, wherein the funds message indicates monetary funds were received by an escrow account or a transfer of funds smart contract was signed by the buyer.

8. The computer-implemented method according to claim 7, further comprising:

determining a quality of the physical object; and determining whether the quality of the physical object satisfies a quality threshold or the quality matches a description of the physical object.

9. The computer-implemented method according to claim 8, wherein determining the quality of the physical object comprises analyzing one or more images of the physical object using a machine learning model.

10. The computer-implemented method according to claim 1, further comprising:

receiving a validation message, wherein the validation message indicates the seller has possession of the physical object, and wherein the validation message includes a device attested timestamp generated by the computing device that scanned the physical object.

11. The computer-implemented method according to claim 10, wherein the rights are transferred as a result of receiving the validation message.

12. The computer-implemented method according to claim 1, wherein the digital asset includes a cryptographic token.

13. The computer-implemented method according to claim 12, wherein the cryptographic token is a non-fungible token (NFT).

14. The computer-implemented method according to claim 1, wherein the physical object is one or more of: footwear, apparel, art, equipment, an event ticket, and a functional asset.

15. A computing device comprising:

processing circuitry;

a memory containing instructions executable by the processing circuitry for transferring rights to a physical object with a digital asset, the computing device is operative to:

obtain a wallet identifier associated with a seller of the physical object;

receive, from a computing device, an identifier associated with the physical object, wherein the identifier is obtained by the computing device scanning the physical object;

determine a wallet associated with the wallet identifier that owns the digital asset linked to the physical object;

receive a signature of the wallet, wherein the signature indicates that the seller owns the wallet;

verify, by the same computing device that scanned the physical object, that the signature is cryptographically bound to the identifier associated with the physical object, wherein verifying comprises validating that the signature was generated over data including the identifier;

determine whether the physical object is authentic;

generate, only upon successful verification of the cryptographic binding, a transfer authorization token that is valid for a single transfer of rights and expires after a predetermined time interval; and transfer one or more rights to the physical object and the digital asset to a buyer using the transfer authorization token, wherein the transfer is performed only upon presentation of the transfer authorization token while the transfer authorization token remains valid and unexpired, and wherein the transfer authorization token is invalidated upon completion of the single transfer.

16. The computing device according to claim 15, wherein the rights transferred to the buyer include one or more of: ownership rights, fractional ownership rights, temporary ownership rights, leasing, and renting.

17. The computing device according to claim 15, wherein the physical object includes a near-field communication (NFC) chip and the identifier is obtained by the computing device scanning the NFC chip of the physical object.

18. The computing device according to claim 17, wherein determining the physical object is authentic comprises: receiving an authentication message indicating the physical object includes the NFC chip, wherein the authentication message was transmitted by the buyer or a third party, and wherein the authentication message includes a cryptographic proof that the NFC chip responded to a challenge generated by the computing device.

19. The computing device according to claim 15, further operative to: generate a listing for the physical object as a result of determining the wallet owns the digital asset, and only after verifying the cryptographic binding between the wallet signature and the identifier associated with the physical object.

20. The computing device according to claim 19, further operative to:

move the digital asset into an escrow wallet account or receiving an indication of a right to transfer a smart contract related to the NFT, wherein the escrow wallet account is unlocked only upon presentation of the transfer authorization token.

21. The computing device according to claim 20, further operative to: receive a purchasing message transmitted from the buyer, wherein the purchasing message indicates the listing; and receive a funds message, wherein the funds message indicates monetary funds were received by an escrow account or a transfer of funds smart contract was signed by the buyer.

22. The computing device according to claim 21, further operative to: determine a quality of the physical object; and determine whether the quality of the physical object satisfies a quality threshold or the quality matches a description of the physical object.

23. The computing device according to claim 22, wherein determining the quality of the physical object comprises analyzing one or more images of the physical object using a machine learning model.

24. The computing device according to claim 15, further operative to: receive a validation message, wherein the validation message indicates the seller has possession of the physical object, and wherein the validation message includes a device attested timestamp generated by the computing device that scanned the physical object.

25. The computing device according to claim 24, wherein the rights are transferred as a result of receiving the validation message.

26. The computing device according to claim 15, wherein the digital asset includes a cryptographic token.

27. The computing device according to claim 26, wherein the cryptographic token is a non-fungible token (NFT).

28. The computing device according to claim 15, wherein the physical object is one or more of: footwear, apparel, art, equipment, an event ticket, and a functional asset.

29. A computer program product comprising a non-transitory computer readable medium storing a computer program comprising instructions which, when executed by processing circuitry, causes the processing circuitry to carry out the method of claim 1, including verifying that the wallet signature is cryptographically bound to the identifier associated with the physical object and generating a single-use transfer authorization token.

30. An apparatus for transferring rights of a physical object with a digital asset, the apparatus comprising:

a memory;

processing circuitry coupled to the memory, wherein the apparatus is configured to:

obtain a wallet identifier associated with a seller of the physical object;

receive, from a computing device, an identifier associated with the physical object, wherein the identifier is obtained by the computing device scanning the physical object;

determine a wallet associated with the wallet identifier that owns the digital asset linked to the physical object;

receive a signature of the wallet, wherein the signature indicates that the seller owns the wallet;

verify, by the same computing device that scanned the physical object, that the signature is cryptographically bound to the identifier associated with the physical object, wherein verifying comprises validating that the signature was generated over data including the identifier;

determine whether the physical object is authentic;

generate, only upon successful verification of the cryptographic binding, a transfer authorization token that is valid for a single transfer of rights and expires after a predetermined time interval; and transfer one or more rights to the physical object and the digital asset to a buyer using the transfer authorization token, wherein the transfer is performed only upon presentation of the transfer authorization token while the transfer authorization token remains valid and unexpired, and wherein the transfer authorization token is invalidated upon completion of the single transfer.

* * * * *